United States Patent
Norman

[19]

[11] Patent Number: 5,942,970
[45] Date of Patent: Aug. 24, 1999

[54] IMAGE OPTICAL-TO-TACTILE CONVERTER

[76] Inventor: Jim Norman, 27 Longspring, Watford Hertfordshire WD2 5NA, United Kingdom

[21] Appl. No.: 09/168,112

[22] Filed: Oct. 8, 1998

[51] Int. Cl.$^6$ .................................................. H04B 3/36
[52] U.S. Cl. ......................... 340/407.1; 340/825.19; 358/484; 382/114; 384/62; 434/113; 434/114
[58] Field of Search .................... 340/407.1, 407.2, 340/965, 825.19; 434/113, 114; 348/62, 63; 382/114, 53; 358/484

[56] References Cited

U.S. PATENT DOCUMENTS

| | | | |
|---|---|---|---|
| 5,065,434 | 11/1991 | Matsuoka et al. | 382/1 |
| 5,306,152 | 4/1994 | Shimoda | 434/114 |
| 5,574,576 | 11/1996 | Martin | 348/62 |
| 5,636,038 | 6/1997 | Lynt et al. | 348/62 |
| 5,685,721 | 11/1997 | Decker | 434/114 |

*Primary Examiner*—Edward Lefkowitz
*Assistant Examiner*—Davetta Woods

[57] ABSTRACT

A system is provided including a tactile assembly having a plurality of solenoid units adapted to transfer to an extended orientation upon the actuation thereof. Also included is a camera unit for generating an image indicative of a present perspective of objects situated in a predetermined direction. Next provided is control circuitry for actuating the solenoid units to simulate the image generated by the camera unit such that the solenoid units actuated are those which correspond to pixels within the image that have either a higher or lower brightness.

8 Claims, 3 Drawing Sheets

IMAGE OPTICAL-TO-TACTILE CONVERTER

BACKGROUND OF THE INVENTION

1. Field of the Invention

The present invention relates to text scanners and Braille converters and more particularly pertains to a new image optical-to-tactile converter for representing images in a three-dimensional relief format.

2. Description of the Prior Art

The use of text scanners and Braille converters is known in the prior art. More specifically, text scanners and Braille converters heretofore devised and utilized are known to consist basically of familiar, expected and obvious structural configurations, notwithstanding the myriad of designs encompassed by the crowded prior art which have been developed for the fulfillment Of Countless objectives and requirements.

Known prior art text scanners, Braille converters and the like include U.S. Pat. No. 4,992,865; U.S. Pat. No. 4,033,053; U.S. Pat. No. 5,244,288; U.S. Pat. No. 4,194,190; U.S. Pat. Des. 357,907; and U.S. Pat. No. 5,286,199.

In these respects, the image optical-to-tactile converter according to the present invention substantially departs from the conventional concepts and designs of the prior art, and in so doing provides an apparatus primarily developed for the purpose of representing images in a three-dimensional relief format.

SUMMARY OF THE INVENTION

In view of the foregoing disadvantages inherent in the known types of text scanners and Braille converters now present in the prior art, the present invention provides a flew image optical-to-tactile converter construction wherein the said can be utilized for representing images in a three-dimensional relief format.

The general purpose of the present invention, which will be described subsequently in greater detail, is to provide a new image optical-to-tactile converter apparatus and method which has many of the advantages of the text scanners and Braille converters mentioned heretofore and many novel features that result in a new image optical-to-tactile converter which is not anticipated, rendered obvious, suggested, or even implied by any of the prior art text scanners and Braille converters, either alone or in any combination thereof.

To attain this, the present invention generally comprises a tactile assembly having a housing with a top face, a bottom face and a thin peripheral side wall coupled therebetween for defining an interior space. A loud speaker is mounted on the housing for transmitting audible signals upon the receipt thereof. As shown in FIG. 1, the top face has a rectangular cut out formed therein for allowing access to the interior space. The tactile assembly further includes a plurality of solenoid units mounted within the housing in a side-by-side, staggered relationship. As shown in FIG. 4, each solenoid unit includes a vertically oriented cylindrical container mounted on the bottom face of the housing within the interior space thereof. The container extends upwardly from the bottom face of the housing to a point flush with the top face of the housing. For reasons that will soon become apparent, the top face has an aperture formed therein which defines an inwardly extending lip. The solenoid units each further include a shaft having a top end with a hemispherical configuration. A bottom end of the shaft is equipped with a disk-shaped magnet. In use, the shaft is slidably situated within the container with the top end extending through the aperture of the container. For urging the shaft into a retracted orientation, a coil spring is situated about the shaft between the magnet and the inwardly extending lip of the housing. Finally, each solenoid unit includes a relay coil mounted within a lower extent of the container for urging the shaft into an extended orientation against a force of the coil spring upon the actuation thereof. FIGS. 1 & 3 show a hand held, portables camera unit including a clip mounted to rear surface thereof for attaching to a item of clothing of a user. The camera unit includes a laser mounted thereon for directing a beam of light in a predetermined direction. Also included is a light emitting diode for emitting light in the predetermined direction. A charge controlled camera is included for continuously generating a sequence of images indicative of a present perspective of objects situated in the predetermined direction. As shown in FIG. 1, the camera unit is connected to the housing via a wire along which the images may be transmitted. Finally, control circuitry is situated within the housing and connected to the tactile assembly, the loud speaker and the wire of the camera unit for controlling the same. In use, the control circuitry has a first mode of operation for actuating the relay coils to instantaneously simulate each of the images generated by the charge controlled camera. In the first mode of operation, the solenoid units that are actuated are those which correspond to pixels within the images that have a higher brightness. In a second mode of operation, the solenoid units which are actuated are those that correspond to pixels within the images that have a lower brightness. In a third mode of operation, the control circuitry is adapted for simulating one of the images generated by the charge controlled camera at a predetermined time. It should be noted that the control circuitry may operate in the third mode while operating in either the first or second nodes. So that a user is aware of the mode(s) in which the control circuitry is currently operating, the same is further adapted to transmit to the loud speaker audible signals indicative of the mode in which the control circuitry is currently operating. In addition, the control circuitry uses the loud speaker to generate a current time.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new image optical-to-tactile converter apparatus and method which has many of the advantages of the text scanners and Braille converters mentioned heretofore and many novel features that result in a new image optical-to-tactile converter which is not anticipated, rendered obvious, suggested, or even implied by any of the prior art text scanners and Braille converters, either alone or in any combination thereof.

It is another object of the present invention to provide a new image optical-to-tactile converter which may be easily and efficiently manufactured and marketed.

It is a further object of the present invention to provide a new image optical-to-tactile converter which is of a durable and reliable construction.

An even further object of the present invention is to provide a new image optical-to-tactile converter which is susceptible of a low cost of manufacture with regard to both materials and labor, and which accordingly is then susceptible of low prices of sale to the consuming public, thereby making such image optical-to-tactile converter economically available to the buying public.

Still yet another object of the present invention is to provide a new image optical-to-tactile converter which provides in the apparatuses and methods of the prior art some of the advantages thereof, while simultaneously overcoming some of the disadvantages normally associated therewith.

Still another object of the present invention is to provide a new image optical-to-tactile converter for representing images in a three-dimensional relief format.

Even still another object of the present invention is to provide a new image optical-to-tactile converter that includes a tactile assembly having a plurality of solenoid units adapted to transfer to an extended orientation upon the actuation thereof. Also included is a camera unit for generating an image indicative of a present perspective of objects situated in a predetermined direction. Next provided is control circuitry for actuating the solenoid units to simulate the image generated by the camera unit Such that the solenoid units actuated are those which correspond to pixels within the image that have either a higher or lower brightness.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
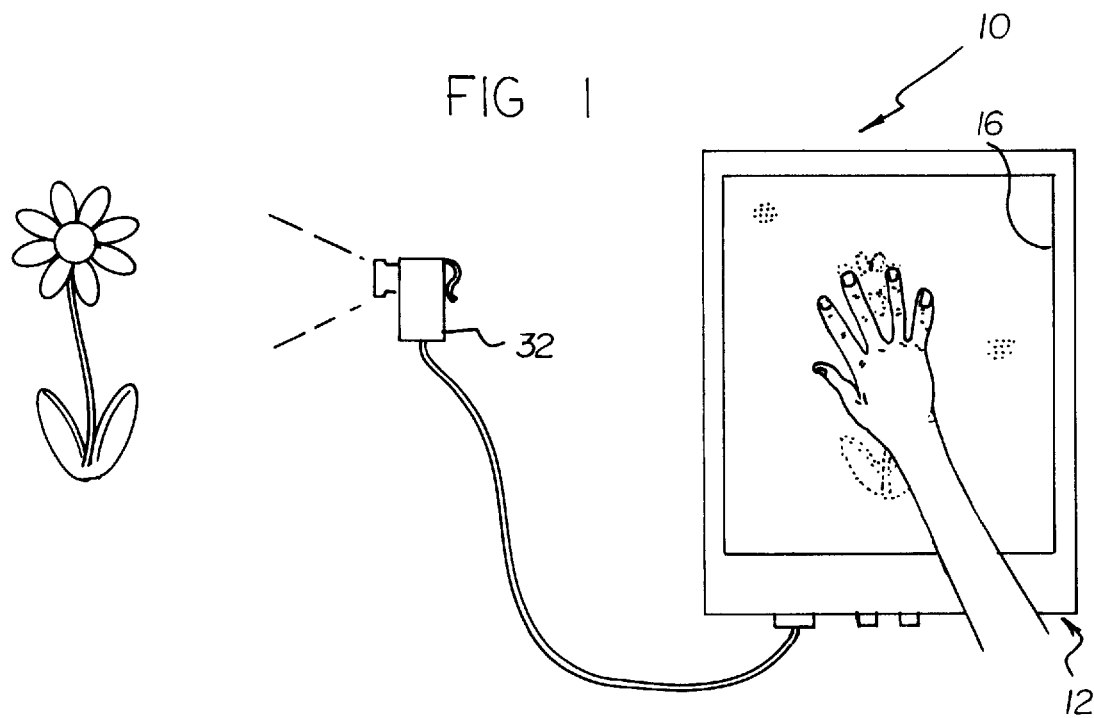
FIG. 1 is an illustration of a new image optical-to-tactile converter according to the present invention.
Figure 2:
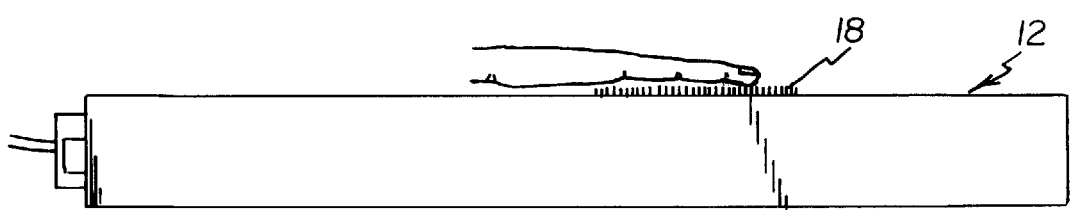
FIG. 2 is a side view of the present invention.

With reference now to the drawings, and in particular to FIGS. 1 through 5 thereof, a new image optical-to-tactile converter embodying the principles and concepts of the present invention and generally designated by the reference numeral 10 will be described.

The present invention, designated as numeral 10, includes a tactile assembly 12 having a housing with a top face, a bottom face and a thin peripheral side wall coupled therebetween for defining an interior space. A loud speaker 14 is mounted on the housing for transmitting audible signals upon the receipt thereof. As shown in FIG. 1, the top face has a rectangular cut out 16 formed therein for allowing access to the interior space. The tactile assembly further includes a plurality of solenoid units 18 mounted in tight abutment within the housing in a side-by-side, staggered relationship.

Figure 4:
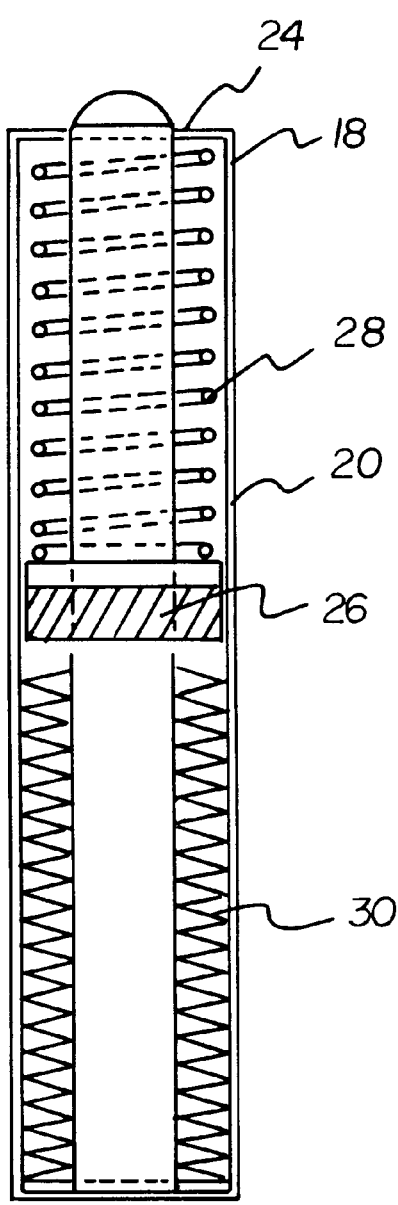
FIG. 4 is a side cross-sectional view of one of the solenoid units of the present invention.
Figure 5:
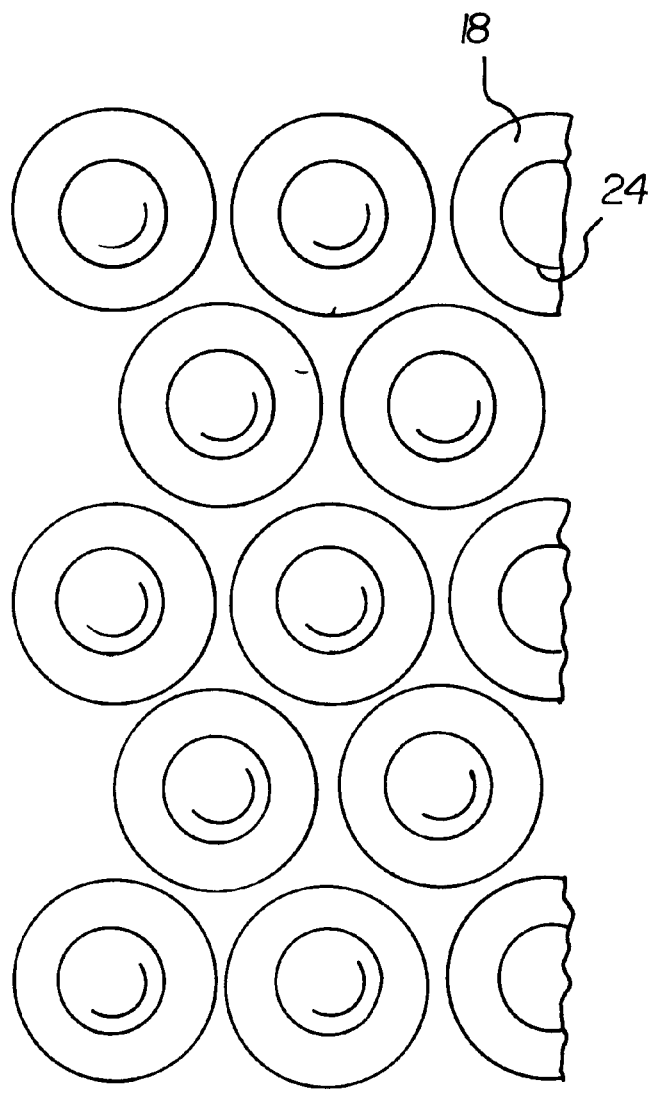
FIG. 5 is a detailed top view of tile solenoid units of the present invention.

As shown in FIG. 4, each solenoid unit includes a vertically oriented cylindrical container 20 mounted on the bottom face of the housing within the interior space thereof. The container extends upwardly from the bottom face of the housing to a point flush with the top face of the housing. For reasons that will soon become apparent, the top face has an aperture 22 formed therein which defines an inwardly extending lip.

The solenoid Un its each further include a shaft 24 having a top end with a hemi-spherical configuration. A bottom end of the shaft is equipped with a disk-shaped magnet 26. In use, the shaft is slidably situated within the container with the top end extending through the aperture of the container.

For urging the shaft into a retracted orientation, a coil spring 28 is situated about the shaft between the magnet and the inwardly extending lip of the housing. Finally, each solenoid unit includes a relay coil 30 mounted within a lower extent of the container for urging the shaft into an extended orientation against a force of the coil spring upon the actuation thereof.

Figure 3:
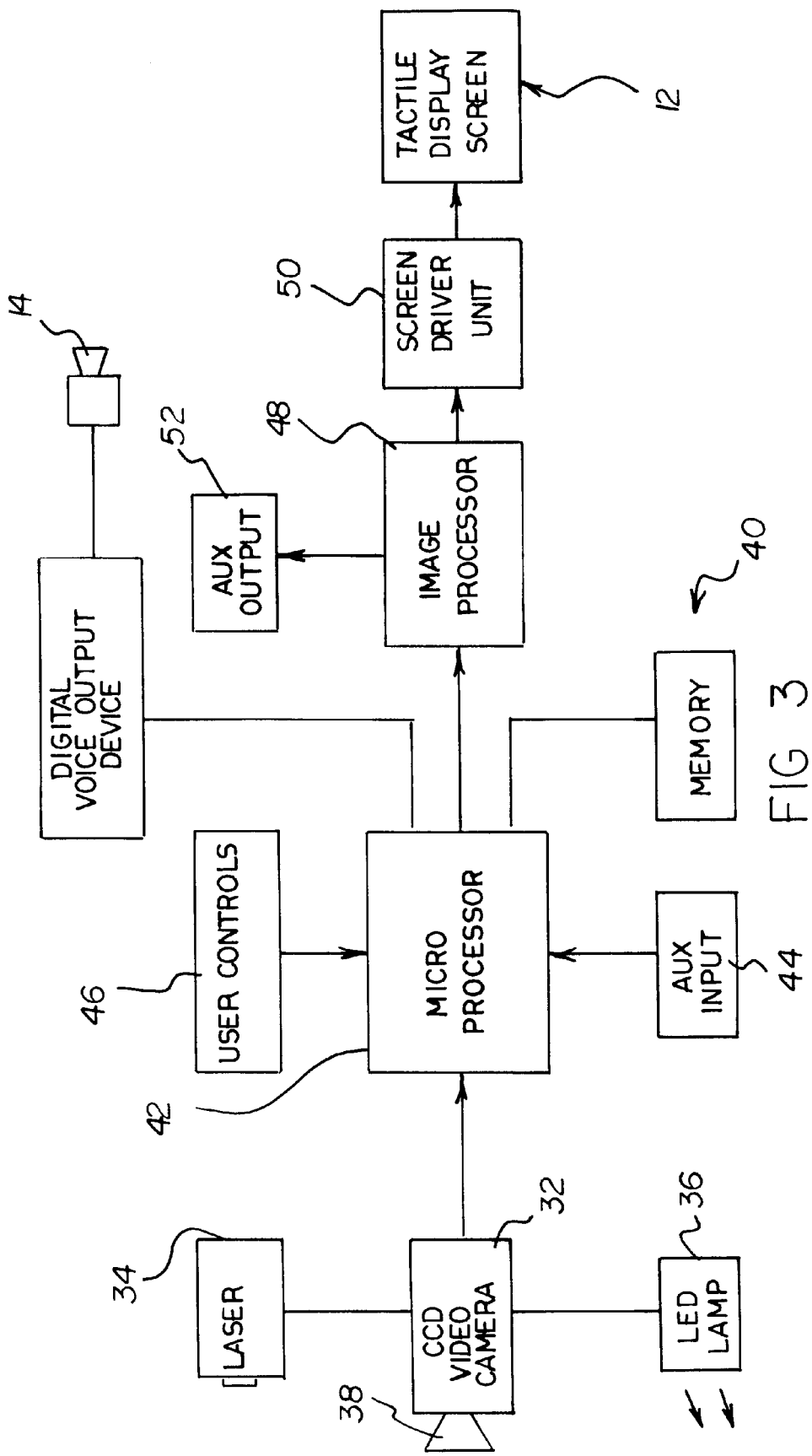
FIG. 3 is a schematic diagram of the present invention.

FIGS. 1 & 3 show a hand held, portable camera unit 32 including a clip mounted to rear surface thereof for attaching to a item of clothing of a user. The camera unit includes a laser 34 mounted thereon for directing a beam of light in a predetermined direction. Also included is a light emitting diode 36 for emitting light in the predetermined direction. A charge controlled camera 38 is included for continuously generating a sequence of images indicative of a present perspective of objects situated in the predetermined direction. It should be noted that filters may be employed to filter light not in a near infrared spectrum. As shown in FIG. 1, the camera unit is connected to the housing via a wire along which the images may be transmitted. It should be understood that the laser works in conjunction with the camera to prevent reflected ambient light from providing interference, as will become apparent.

Finally, control circuitry 40 is situated within the housing and connected to the tactile assembly, the loud speaker and the wire of the camera unit for controlling the same. In use, the control circuitry has a first mode of operation for actuating the relay coils to instantaneously simulate each of the images generated by the charge controlled camera. In the first mode of operation, the solenoid units that are actuated are those which correspond to pixels within the images that have a higher brightness. In a second mode of operation, the solenoid units which are actuated are those that correspond to pixels within the images that have a lower brightness. Preferably, the extent to which the solenoid unit is actuated, or extended, is proportional to the brightness. In a third mode of operation, the control circuitry is adapted for simulating only one of the images generated by the charge controlled camera at a predetermined time. It should be noted that the control circuitry may operate in the third mode while operating in either the first or second modes.

So that a user is aware of the mode(s) in which tile control circuitry is currently operating, the same is further adapted to transmit to the loud speaker audible signals indicative of the current mode. In addition, the control circuitry uses the loud speaker to indicate a current time.

To accomplish the foregoing functions, the control circuitry preferably includes a microprocessor 42 which is connected to the charge controlled camera and a digital voice output device which is in turn connected to the loud speaker. Also connected to the microprocessor is an auxiliary input 44 for allowing the use of another video input means such as a remote camera, recorded video, or computer stored images. User controls 46 are also connected to the microprocessor for allowing the user to select a desired mode of operation. For example, a brightness button may determine whether the control circuitry operates in either the first or second mode. Further, a freeze frame button may be employed to run the control circuitry in the third mode.

Connected to the microprocessor is an image processor 48 and a screen driver unit 50 which together interpret the received processed image and generate an activation signal with an associated address for actuating predetermined relay coils of the solenoid units. A look-up table may be employed to transmit the activation signals in accordance with the addresses to the appropriate relay coils. The image processor preferably has an auxiliary output 52 for allowing the connection of a conventional video output device thereto so that a person may visually monitor the images received. This may be accomplished by illuminating certain pixels on the video output device which correspond to the actuated relay coils. The screen driver unit preferably includes a PAL 50 Hz or NTSC 60Hz raster scan system commonly used with LCD television sets.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for generating a tactile representation of an image comprising, in combination:

a tactile assembly including a housing with a top face, a bottom face and a thin peripheral side wall coupled therebetween for defining an interior space, the top face having a rectangular cut out formed therein for allowing access thereto, the tactile assembly further including a plurality of solenoid units mounted within tile housing in a side-by-side, staggered relationship and each including:

a vertically oriented cylindrical container mounted on the bottom face of the housing within the interior space thereof and extending upwardly therefrom to a point flush with the top face of the housing, the top face having an aperture formed therein which defines an inwardly extending lip, a shaft including a top end with a hemi-spherical configuration and a bottom end with a disk-shaped magnet, the shaft being slidably situated within the container with the top end extending through the aperture of the container, a coil spring situated about the shaft between the magnet and the inwardly extending lip of the housing for urging the shaft into a retracted orientation, and a relay coil mounted within a lower extent of the container for urging the shaft into an extended orientation against a force of the coil spring upon the actuation thereof;

a loud speaker mounted on the housing for transmitting audible signals upon the receipt thereof;

a hand held, portable camera unit including a laser mounted thereon for directing a beam of light in a predetermined direction, a light emitting diode for emitting light in the predetermined direction, a charge controlled camera for continuously generating a sequence of images indicative of a present perspective of objects situated in the predetermined direction, the camera unit connected to the housing via a wire along which the images may be transmitted; and control circuitry situated within the housing and connected to the tactile assembly, the loud speaker and the wire of the camera unit, the control circuitry having a first mode of operation for actuating the relay coils to instantaneously simulate each of the images generated by the charge controlled camera such that the solenoid units actuated are those which correspond to pixels within the images that have a higher brightless, a second mode of operation for actuating the relay coils to instantaneously simulate each of the images generated by the charge controlled camera such that the solenoid units actuated are those which correspond to pixels within the images that have a lower brightness, and a third mode of operation for simulating one of the images generated by the charge controlled camera at a predetermined time, the control circuitry further adapted to transmit to the loud speaker audible signals indicative of the mode in which the control circuitry is currently operating and a current time.

2. A system for generating a tactile representation of an image comprising:

a tactile assembly including a plurality of solenoid units adapted to transfer to an extended orientation upon the actuation thereof;

a camera unit for generating an image indicative of a present perspective of objects in a predetermined direction; and control circuitry Connected to the camera unit and tactile assembly for actuating the solenoid units to simulate the image generated by the camera unit such that the solenoid units actuated are those which correspond to pixels within the image that have one of a higher or lower brightness.

3. A system for generating a tactile representation of an image as set forth in claim 2 wherein the camera unit generates a sequence of images in real time and the control circuitry is adapted for actuating the solenoid units to instantaneously simulate each of the images generated by the camera unit.

4. A system for generating a tactile representation of an image as set forth in claim 2 and further including a loud speaker mounted on the housing for transmitting audible signals upon the receipt thereof, wherein the control circuitry is adapted to transmit to the loud speaker audible signals indicative of a mode in which the control circuitry is currently operating.

5. A system for generating a tactile representation of an image as set forth in claim 2 wherein each solenoid unit includes: a vertically oriented cylindrical container having an aperture formed therein which defines an inwardly extending lip, a shaft including a top end with a hemispherical configuration and a bottom end with a disk-shaped magnet, the shaft being slidably situated within the container with the top end extending through the aperture of the container, a coil spring situated about the shaft between the magnet and the inwardly extending lip of the housing for urging the shaft into a retracted orientation, and a relay coil mounted within a lower extent of the container for urging the shaft into an extended orientation against a force of the coil spring upon the actuation thereof.

6. A system for generating a tactile representation of an image as set forth in claim 2 wherein the camera unit is hand held and portable with respect to the tactile assembly.

7. A system for generating a tactile representation of an image as set forth in claim 2 wherein the camera unit includes a laser mounted thereon for directing a beam of light in the predetermined direction and the camera unit operates in the near infrared spectrum.

8. A system for generating a tactile representation of an image as set forth in claim 7 wherein the camera unit includes a light emitting diode for emitting light in the predetermined direction.

* * * * *